United States Patent Office 3,702,366
Patented Nov. 7, 1972

3,702,366
BIS-(TETRAHALOETHYL) TRISULFIDES AS
SEED DISINFECTANTS
Gustave K. Kohn, Berkeley, Calif., assignor to Chevron
Research Company, San Francisco, Calif.
No Drawing. Original application Nov. 29, 1968, Ser. No.
780,292, now Patent No. 3,574,767, dated Apr. 13,
1971. Divided and this application Sept. 21, 1970,
Ser. No. 74,232
Int. Cl. A01n 9/00, 9/12
U.S. Cl. 424—336                                     4 Claims

ABSTRACT OF THE DISCLOSURE

Compositions and methods of disinfecting seeds with bis-(tetrahaloethyl) trisulfides are provided.

CROSS REFERENCE TO RELATED APPLICATIONS

This application is a divisional of application Ser. No. 780,292, filed Nov. 29, 1968 now U.S. Pat. No. 3,574,767.

FIELD OF INVENTION

This invention relates to bis-(polyhalohydrocarbyl) trisulfides and their use as seed disinfectants.

The trisulfides of this invention are bis-(trihalovinyl) and bis-(tetrahaloethyl) trisulfides. Accordingly, the polyhalohydrocarbyl group of these compounds may be described as being free of acetylenic unsaturation and consisting of 2 carbon atoms and, when the group is olefinically unsaturated 3 halogen atoms of atomic number 17 to 35 or when the group is saturated 4 halogen atoms of atomic number 17 to 35 and one hydrogen atom. Halogens of atomic number 17 to 35 are Cl and Br. The bis-(tetrachloroethyl) trisulfides are preferred because of their superior seed disinfectant properties.

The preferred bis-(tetrachloroethyl) trisulfides may be represented by the formula

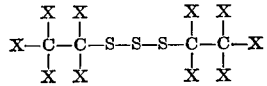

wherein 4 of the X's on each ethyl group represent chlorine and the remaining X represents hydrogen. Included in this genus are bis-(1,1,2,2-tetrachloroethyl) trisulfide and bis-(1,2,2,2-tetrachloroethyl) trisulfide.

Other trisulfides of this invention are exemplified by bis-(tetrabromoethyl) trisulfide, bis-(tribromovinyl) trisulfide, bis - (1,2 - dibromo - 2,2-dichloroethyl) trisulfide and bis-(2-chloro-1,2-dibromovinyl) trisulfide.

These trisulfides may be prepared by reacting polyhalohydrocarbyl sulfenyl chlorides with hydrogen sulfide. This reaction, as applied to the preferred trisulfides of this invention, proceeds according to the following equation:

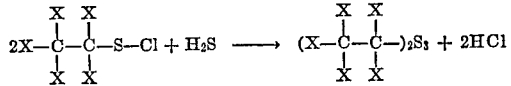

where X is as defined previously.

The sulfenyl chloride is added slowly to hydrogen sulfide dissolved in a non-polar solvent. Reaction temperatures of about −10° C. to +50° C. will normally be used. Preferably the temperature will be maintained between 0 and 5° C. to keep the reaction rate controlled. In this respect, the reaction is exothermic and care should be taken when higher temperatures are used. The reaction time will depend principally on the temperature. Usually it will be completed within 2 to 24 hours. However, the reaction between hydrogen sulfide and trichlorovinylsulfonyl chloride is instantaneous.

As usually practiced, the reaction is carried out at atmospheric or autogenous pressure. Some positive pressure may be applied if arrangements are made to vent the hydrogen chloride formed.

The non-polar solvents for this reaction are neutral organic liquids, examples being diethyl ether, dichloromethane, tetrahydrofuran, and acetonitrile. It is preferred that the solvents be low boiling in order to facilitate their separation and recovery of the trisulfide product.

Generally, an excess of $H_2S$ is used in the reaction. However, this excess does not hinder the reaction or prevent the formation of large quantities of the desired product. In general, the yield is in the range of 65–85% of theoretical based on the sulfenyl chloride. Stoichiometric amounts of $H_2S$ and sulfenyl chloride may be used if desired.

EXAMPLES

The preparation of the trisulfides of this invention is exemplified by the following examples. Percentages are by weight.

EXAMPLE 1

A 2- liter flask equipped with a gas inlet tube, a gas outlet tube, a thermometer, and a magnetic stirrer was immersed in an ice bath. The gas outlet tube was connected to a glass U-tube partially filled with mineral oil to exert a slight back pressure. This flask was charged with 1 liter of ether which was allowed to cool to about 0–5° C. Then $H_2S$ was passed into the cold ether until the ether was saturated; about 25–30 grams (about 0.85 mol) of $H_2S$ was dissolved. A cold solution of 93.7 grams (0.4 mol) of 1,1,2,2-tetrachloroethylsulfenyl chloride in 100 ml. of ether was added dropwise to the stirred $H_2S$ solution over a period of about 15 minutes. Then the mixture was gradually warmed to 20° C. and allowed to stand at this temperature for 64 hours. At the end of this time, nitrogen was passed through the solution for 20 minutes to strip out all unreacted $H_2S$ and to concentrate the solution by removing most of the ether. The resulting solution was filtered, and the remaining ether was removed by heating at 90° C. under less than 1 mm. of pressure. The material was filtered again through a Celite filter aid to give 77 grams of crude bis(1,1,2,2-tetrachloroethyl) trisulfide.

*Analysis.*—Calculated for $C_4H_2Cl_6S_3$ (percent): Cl, 66.0; S, 22.4. Found (percent): Cl, 64.95; S, 23.71. An infrared spectrum had strong adsorption peaks at 8.0, 8.25, 9.8, 12.4, 13.2 and 13.95 microns. The 19.0-micron adsorption band typical of —S—Cl bonding was absent.

EXAMPLE 2

Essentially the same procedure as Example 1 was followed using 32.3 grams (0.163 mol) of trichlorovinylsulfenyl chloride and 7.5 grams (0.22 mol) of $H_2S$. The crude product was passed onto a column of 180 grams of silica gel. It was eluted with hexane, thereby giving 27 grams of a clear yellow liquid.

*Analysis.*—Calculated for $C_4Cl_6S_3$ (percent): Cl, 59.7; S, 26.95. Found (percent): Cl, 59.6; S, 26.65. An infrared spectrum showed strong adsorption at 6.5 and 11.3 microns.

EXAMPLE 3

Essentially the same procedure as Example 2 was followed using 23.4 grams (0.1 mol) of 1,2,2,2-tetrachloroethylsulfenyl chloride and 10 grams (0.3 mol) of $H_2S$. The product was a brown liquid weighing 19.3 grams.

*Analysis.*—Calculated for $C_4H_2Cl_6S_3$ (percent): Cl, 65.8; S, 22.38. Found (percent): Cl, 62.8; S, 22.57. An infrared spectrum showed strong adsorption at 12.35 and 13.3 microns.

UTILITY

The saturated trisulfides of this invention are useful for controlling pathogens such as fungi, bacteria and yeasts which attack seeds and other vegetative hosts. They are particularly useful for disinfecting crop and feed seeds such as corn, oats, barley, wheat, peas, beans, cotton and sugar beet. Typical organisms controlled by these trisulfides are Fusarium, Penicillium, Aspergillus, Rhizopus, Rhizoctonia and yeast.

One or more of the saturated trisulfides of this invention will be applied to the seed or other host in amounts which are toxic to the pathogens. About 0.2 to 20 oz. trisulfide per 10 lbs. seed will usually be needed to give adequate control. The trisulfide may be applied in liquid or solid form. When used in solid form the trisulfide will be absorbed on a particulate carrier such as talc, clay, silica, charcoal, limestone, loam and the like. These solid formulations may be dusted onto the seed by established techniques. Alternatively, they may be applied as an aqueous slurry by spraying or dipping. When applied as a liquid, the trisulfide will be dissolved in solvents such as benzene, toluene and lower alkyl ketones, e.g., acetone and methyl isobutyl ketone. These solutions may be applied as the above-mentioned aqueous slurry with the addition of an emulsifier.

In addition to the solid or liquid diluent formulations of these trisulfides, they may also contain dispersing agents, adjuvants, plant nutrients, binders and other pesticides.

The use of the saturated trisulfides of this invention as seed disinfectants was illustrated by the following tests.

Bis-(1,1,2,2-tetrachloroethyl) trisulfide was dissolved in a small amount of acetone. A small portion of emulsifier (alkylarylpolyoxyethylene glycol and fatty acid) was added and the solution was diluted with water to the desired concentration. This mixture was distributed on the wall of a glass jar. Corn seed, which has been inoculated previously with a spectrum of fungi and yeast and kept at 4° C. to prevent organism growth, were rolled in the jars until they were coated and the mixture was completely absorbed on them. Following this treatment the seeds were placed on potato dextrose agar plates and incubated. After 2 days the organism growth was measured and the percent organism control calculated. For comparison a known structurally related seed disinfectant, bis-(trichloromethyl) trisulfide, was tested by the above method in side-by-side tests. The results of these tests are tabulated below.

| Trisulfide | Concentration, oz./cwt. | Organism, percent control ||||  |
|---|---|---|---|---|---|---|
| | | Fusarium spp. | Penicillium and Aspergillus spp. | Rhizopus spp. | Sum of all fungi | Yeast |
| Bis-(1,1,2,2-tetrachloroethyl) trisulfide | 1 | 100 | 100 | 82 | 91 | 100 |
| | 0.4 | 100 | 100 | 63 | 81 | 100 |
| Comparison compound |||||||
| Bis-(trichloromethyl) trisulfide | 1 | 88 | 91 | 35 | 62 | 100 |
| | 0.4 | 18 | 85 | 0 | 12 | 99.3 |

The above data evidence the substantial superiority of the tetrachloroethyl compounds over the most closely related known compound.

Bis-(1,1,2,2-tetrachloroethyl) trisulfide has also exhibited bactericidal activity against Erwinia and Pseudomonas at 500 p.p.m.

Unsaturated trisulfides of this invention are useful for controlling algae and related aquatic plants. They may be used to control such organisms in aqueous industrial effluents and cooling streams, lakes, streams, canals and pools. When so used an algicidal amount of one or more of these trisulfides is added to the aqueous growth environment of the organism. This amount will normally range between about 0.1 and 50 p.p.m.; more usually between 0.1 and 10 p.p.m. In terms of lbs. of trisulfide per acre of water one foot deep, 0.1 to 10 p.p.m. is equal to about 0.3 to 18 lbs. per acre water one foot deep. These trisulfides may be applied to the organism's environment as water-dispersible powders or in solution with water-miscible solvents.

Bis-(trichlorovinyl) trisulfide was tested by the following method to illustrate the above-described algicidal utility of the unsaturated trisulfides of this invention.

An acetone solution of equal parts of trisulfide and a surfactant was prepared. This solution was mixed with a nutrient broth in a quantity sufficient to give a concentration of 2 p.p.m. trisulfiide. Four replicate 150 ml. specimen cups were filled with this mixture. 350-400 mg. of Euglena was added to each specimen cup and the cups were then placed in an environment chamber for incubation. The cups were observed periodically for algae growth. The algicidal effectiveness of the trisulfide was determined based on a final observation of algae growth after 10 days.

Bis-(trichlorovinyl) trisulfide provided 100% control of Euglena in the above test.

I claim:

1. A method for controlling fungi, bacteria and yeasts which attack seeds which comprises applying a toxic amount of bis-(tetrachloroethyl) trisulfide to the seed.

2. A method for controlling fungi, bacteria and yeasts which attack seeds which comprises applying a toxic amount of the bis-(tetrachloroethyl) trisulfide of claim 1 wherein the tetrachloroethyl group is 1,1,2,2-tetrachloroethyl.

3. A composition for applying to seeds to control fungi, bacteria and yeasts attacking said seeds comprising a biocidal amount of bis-(tetrachloroethyl) trisulfide and a diluent therefor.

4. The composition of claim 3 wherein the bis-(tetrachloroethyl) trisulfide is bis-(1,1,2,2-tetrachloroethyl) trisulfide.

References Cited

UNITED STATES PATENTS

| 2,917,429 | 12/1959 | Scott et al. | 424—336 |
| 3,103,465 | 9/1963 | Goodhue et al. | 424—336 |
| 3,185,620 | 5/1965 | Goodhue et al. | 424—336 |

FOREIGN PATENTS

| 985,938 | 7/1951 | France | 424—336 |

ALBERT T. MEYERS, Primary Examiner

F. E. WADDELL, Assistant Examiner

UNITED STATES PATENT OFFICE
CERTIFICATE OF CORRECTION

Patent No. 3,702,366             Dated November 7, 1972

Inventor(s) GUSTAVE K. KOHN

It is certified that error appears in the above-identified patent and that said Letters Patent are hereby corrected as shown below:

Col. 2, line 60, and Col. 3, line 38, "$C_4H_2Cl_6S_3$" should read --$C_4H_2Cl_8S_3$--.

Col. 3, line 55, "per 10 lbs. seed" should read --per 100 lbs. seed--.

Signed and Sealed this

Twenty-sixth Day of October 1976

[SEAL]

Attest:

RUTH C. MASON             C. MARSHALL DANN
*Attesting Officer*             *Commissioner of Patents and Trademarks*